(12) United States Patent
Lee et al.

(10) Patent No.: US 10,699,032 B2
(45) Date of Patent: Jun. 30, 2020

(54) CONNECTION ICON INFORMATION MANAGEMENT SYSTEM AND METHOD THEREFOR

(71) Applicants: Se-yong Lee, Seoul (KR); Kyo-sik Hong, Seongnam (KR); TW Mobile Co., Ltd., Seoul (KR)

(72) Inventors: Se-yong Lee, Seoul (KR); Kyo-sik Hong, Seongnam (KR)

(73) Assignees: TW MOBILE CO., LTD., Seoul (KR); Se-Yong Lee, Seoul (KR); Kyo-Sik Hong, Seongnam-si (KR)

(*) Notice: Subject to any disclaimer, the term of this patent is extended or adjusted under 35 U.S.C. 154(b) by 419 days.

(21) Appl. No.: 15/501,435

(22) PCT Filed: Aug. 4, 2015

(86) PCT No.: PCT/KR2015/008134
§ 371 (c)(1),
(2) Date: Feb. 2, 2017

(87) PCT Pub. No.: WO2016/021909
PCT Pub. Date: Feb. 11, 2016

(65) Prior Publication Data
US 2017/0228563 A1 Aug. 10, 2017

(30) Foreign Application Priority Data

Aug. 4, 2014 (KR) .................. 10-2014-0099705

(51) Int. Cl.
*G06F 21/84* (2013.01)
*G06Q 50/10* (2012.01)
(Continued)

(52) U.S. Cl.
CPC ............ *G06F 21/84* (2013.01); *G06F 3/0488* (2013.01); *G06F 3/04817* (2013.01);
(Continued)

(58) Field of Classification Search
CPC .. G06F 3/04817; G06F 21/84; G06F 3/04883; G06F 21/41; G06F 3/0488;
(Continued)

(56) References Cited

U.S. PATENT DOCUMENTS 6,857,104 B1 * 2/2005 Cahn ..................... G06F 3/0482
345/168
7,433,920 B2 * 10/2008 Blagsvedt .............. G06Q 10/10
709/204
(Continued)

FOREIGN PATENT DOCUMENTS

KR 10-2001-0067763 A 7/2001
KR 10-2012-0101187 A 9/2012
(Continued)

OTHER PUBLICATIONS

ContActive: Re-Designing the Interface of Smartphone Contacts Application for the Optimal Decision in Choosing Interpersonal-Communication Channel. HCI 2013 Conference, Jan. 2013, pp. 397-401, See pp. 398-400.

*Primary Examiner* — Andrew L Tank
(74) *Attorney, Agent, or Firm* — Patent Office of Chung Park (57) ABSTRACT

The present invention relates to a connection icon information management system and a method therefor, and the purpose of the present invention is to provide a connection icon information management system and a method therefor, wherein the system distributes a multi-connection icon enabled to connect, by a simple operation in a state of hiding as hidden values, a plurality of communication means and identification information of each communication means, with respect to a counterpart, does not need to input a plurality of pieces of identification information on by one by simply distributing the connection icon, which can turn into the corresponding multi-connection icon and can be distrib- (Continued)

uted through an SMS or e-mail, an MMS and the like, can prevent the intuitive exposure of the identification information, and enables continuous communication connection irrespective of a change in actual information.

11 Claims, 9 Drawing Sheets (51) Int. Cl.
| | |
|---|---|
| *G06F 3/0488* | (2013.01) |
| *H04W 4/21* | (2018.01) |
| *H04W 4/50* | (2018.01) |
| *G06F 21/41* | (2013.01) |
| *H04L 12/58* | (2006.01) |
| *H04M 1/725* | (2006.01) |
| *H04W 76/10* | (2018.01) |
| *G06F 3/0481* | (2013.01) |
| *G06F 21/31* | (2013.01) |
| *H04L 29/08* | (2006.01) |
| *H04W 4/14* | (2009.01) |

(52) U.S. Cl.
CPC ........ *G06F 3/04883* (2013.01); *G06F 21/316* (2013.01); *G06F 21/41* (2013.01); *G06Q 50/10* (2013.01); *H04L 51/22* (2013.01); *H04M 1/72519* (2013.01); *H04W 4/21* (2018.02); *H04W 4/50* (2018.02); *H04W 76/10* (2018.02); *G06F 2203/04808* (2013.01); *H04L 51/04* (2013.01); *H04L 51/10* (2013.01); *H04L 51/18* (2013.01); *H04L 67/02* (2013.01); *H04W 4/14* (2013.01)

(58) Field of Classification Search
CPC .... G06F 3/04842; G06F 3/017; G06F 21/316; G06F 8/61; H04W 4/21; H04W 4/50; H04W 76/10; H04W 4/14; G06Q 10/10; G06Q 50/10; H04L 51/22; H04L 51/18; H04L 51/04; H04L 51/10; H04L 51/36; H04L 67/02; H04M 1/72519; H04M 1/72547; H04M 1/72683
See application file for complete search history.

(56) References Cited

U.S. PATENT DOCUMENTS

| | | | |
|---|---|---|---|
| 8,233,885 B2* | 7/2012 | Kansal | H04M 1/72547 379/88.13 |
| 9,807,694 B2* | 10/2017 | Yoon | G06F 3/0488 |
| 10,095,375 B2* | 10/2018 | van Os | G06F 3/04817 |
| 2004/0100497 A1* | 5/2004 | Quillen | H04L 67/36 715/751 |
| 2005/0172001 A1* | 8/2005 | Zaner | H04L 29/06 709/205 |
| 2006/0084450 A1* | 4/2006 | Dam Nielsen | H04M 1/27455 455/466 |
| 2007/0035513 A1* | 2/2007 | Sherrard | G06F 3/04817 345/157 |
| 2008/0132243 A1* | 6/2008 | Spalink | G09B 29/106 455/456.1 |
| 2009/0098911 A1* | 4/2009 | Kim | H04M 1/576 455/566 |
| 2010/0153886 A1* | 6/2010 | Hautala | G06F 3/0482 715/847 |
| 2013/0246111 A1* | 9/2013 | McCormack | G06F 3/017 705/7.13 |
| 2015/0082257 A1* | 3/2015 | Han | G06F 3/0488 715/863 |
| 2015/0186008 A1* | 7/2015 | Hicks | G06F 3/04817 715/765 |

FOREIGN PATENT DOCUMENTS

| | | |
|---|---|---|
| KR | 10-2013-0062305 A | 6/2013 |
| KR | 10-2013-0112040 A | 10/2013 |
| KR | 10-2014-0035603 A | 3/2014 |

* cited by examiner

CONNECTION ICON INFORMATION MANAGEMENT SYSTEM AND METHOD THEREFOR

TECHNICAL FIELD

The present invention relates to an access icon information management system and a method therefor, and more particularly, to an access icon information management system that distributes multi-access icons allowing a user to access through a simple operation in a state in which a plurality of communication means and identification information for each communication means for a counterpart are hidden as a hidden value and distributes an access icon that may be converted to a multi-access icon and simply distributed by an SMS, an e-mail, an MMS, or the like, such that there is no need to input a plurality of identification information one by one, it is possible to prevent intuitive exposure of the identification information, and communication access may be continuously made even when an actual identification information is changed, and a method therefor.

BACKGROUND ART

Recently, in accordance with development of a communication environment, it is necessary for an individual user to remember a large number of identification information (e.g. ID) and authentication information (e.g. password) that should be remembered by the user, or remember communication identification information (e.g. mobile phone number, work phone number, home phone number, work fax number, etc.), and remember Internet identification information (e.g. website address, social network ID, URL address, e-mail ID, etc.), thereby resulting in inconvenience.

Further, in an environment in which such heterogeneous communication devices are in everywhere, the user should remember various identification information (ID or phone number) of other people as well as identification information of the user, and in a case of a mobile phone, if the user has forgot a phone number of an acquaintance, the user may lose contact with the acquaintance when the phone number thereof is changed during an out-of-contact period.

Meanwhile, even when the acquaintances of the user give their identification information one by one, since the user needs to record the identification information of the acquaintances in an address book of a smartphone or an address book of e-mail, it is cumbersome and inconvenient to input the information, and it is also cumbersome and time-consuming to inform the acquaintance of identification information of various heterogeneous devices of the user.

DISCLOSURE

Technical Problem

In consideration of the above-mentioned circumstances, it is an object of the present invention to provide an access icon information management system that distributes multi-access icons allowing a user to access through a simple operation in a state in which a plurality of communication means and identification information for each communication means for a counterpart are hidden as a hidden value and distributes an access icon that may be converted to a multi-access icon and simply distributed by an SMS, an e-mail, an MMS, or the like, such that there is no need to input a plurality of identification information one by one, it is possible to prevent intuitive exposure of the identification information, and communication access may be continuously made even when an actual identification information is changed, and a method therefor.

Technical Solution

In order to accomplish the above object, according to one aspect of the present invention, there is provided an access icon information management method, including the steps of: a) receiving, by a user terminal, an access icon of a specific user through an SMS, an MMS, or an e-mail; b) when an icon interface application is installed in the user terminal, changing, by the icon interface application, a specific access icon to a specific multi-access icon; c) counting, by the icon interface application, the number of touch key signals; d) extracting, by the icon interface application, hidden individual access icons matched to the number of sensed touches; e) receiving, by the icon interface application, a click signal for the individual access icons; and f) performing, by the icon interface application, communication access through actual access information matched to the individual access icons.

Preferably, the access icon information management method further includes the step of: before the step a), storing, by an access icon management server, an access icon and a multi-access icon including an ID uniquely assigned for each user, and storing and registering each identification information of the individual access icons included in the multi-access icon of the user.

Preferably, the step b) includes the steps of: sensing whether the access icon is clicked, when the icon interface application is not installed; outputting a hidden text explaining installation of the icon interface application included in the access icon; sensing whether an application installation button included in the hidden text is clicked; and accessing an automatic application installation URL of the access icon.

Preferably, the step b) further includes the step of: automatically transmitting, by the icon interface application, the specific access icon to the access icon management server; extracting, by the access icon management server, a multi-access icon matched to the access icon; and transmitting, by the access icon management server, the extracted multi-access icon to the user terminal.

Preferably, the access icon information management method further includes the step of: in the steps a) to f), when the access icon management server receives an update signal of individual access information from the specific user terminal, performing, by the access icon management server, information update for the multi-access icon, registering, by the access icon management server, update presence information of the multi-access icon, determining, by the icon interface application, whether update information of the multi-access icons is present by communicating with the access icon management server, and performing, by the icon interface application, update for the multi-access icons.

According to another aspect of the present invention, there is provided an access icon information management system, including: a user terminal including an icon interface application installed therein to share access information by communicating with an access icon management server using a multi-access icon including identification information for accessing a plurality of heterogeneous communication means uniquely belong to a single user to be usable depending on the number of operations and having a unique ID, and perform access processing for a specific individual access icon and update processing thereof; and the access icon management server configured to uniquely register the access icon distributed through an SMS, an e-mail, or an MMS so as to induce installation of the icon interface application for each user, and register a multi-access icon matched to the access icon for each user so as to distribute the multi-access icon for each user by communicating with the icon interface application.

Preferably, the access icon and the multi-access icon further include a sign character for distinguishing the ID uniquely assigned for each user, the access icon and the multi-access icon from each other.

Preferably, the access icon includes: a hidden text indicating that when the icon interface application is installed, selective access a plurality of communication means of a specific user is possible; and an application download URL as hidden information to be output when the access icon is clicked.

Preferably, the hidden text includes an application installation button.

Preferably, the access icon is an icon which is automatically changed to the multi-access icon of the user by communication between the icon interface application and the access icon management server when the icon interface application is installed.

Preferably, the multi-access icon includes a plurality of individual access icons as hidden information in advance so that the individual access icons are sequentially output depending on the number of operations, and the icon interface application processes the individual access icons to be output in an order preset depending on the number of touch operations of the multi-access icon, and processes so as to access actual identification information matched to the respective individual access icons.

Preferably, the access icon management server uniquely provides an automatic download URL of the access icons for each user to the respective access icons for each user.

Preferably, the icon interface application outputs address book information so that a user assigned with the multi-access icon and a user not assigned with the multi-access icon in the address book information of the user terminal are distinguished from each other by a sign of the multi-access icon.

Preferably, the icon interface application includes a communication module configured to perform communication with the access icon management server or a user terminal of a counterpart; a member information manager configured to manage information for member authentication; a multi-access icon information manager configured to receive the distributed multi-access icon from the access icon management server, and store and manage the multi-access icon; a key sensor configured to sense the number of touch operations of the multi-access icon, an access icon converter configured to receive the multi-access icon of the specific user by communicating with the access icon management server for the access icon of the specific user; an individual access icon output unit configured to output the individual access icons included in the multi-access icon as hidden information on a screen depending on the number of touches; and a controller configured convert the access icon to the multi-access icon of the user and store and manage the multi-access icon by communicating with the access icon management server for the access icon of the specific user, and sense the number of touches of the multi-access icon to output the individual access icons so as to perform access processing.

Preferably, the icon interface application further includes a call circuit unit configured to process automatic call connection when a phone icon of the individual access icons of the specific user is clicked.

Preferably, the icon interface application further includes an SMS manager configured to output a text input box in which hidden phone number information included in the multi-access icon is automatically input when a text message icon of the individual access icons of the specific user is clicked.

Preferably, the icon interface application further includes an e-mail creator configured to output an e-mail transmission box in which e-mail address information of the user included in the multi-access icon is automatically input when an e-mail icon of the individual access icons of the specific user is clicked.

Preferably, the icon interface application further includes a wireless data communicator configured to output SNS information of the user included in the multi-access icon to be selectable, when an SNS icon of the individual access icons of the specific user is clicked, and allow the user to access an URL address when the SNS information is selected.

Advantageous Effects

In accordance with the access icon information management system and the method according to the present invention, the application may be easily and simply installed, and the access icon including the information may be easily distributed through an e-mail, an SMS, a webpage, or the like. After the application is installed through the access icon, the access icon is automatically changed to a multi-access icon including various identification information for each user attached thereto, thereby rapidly distributing the multi-access icon, and rapidly spreading the application for managing the access icons.

BEST MODE

Hereinafter, the present invention will be described in detail with reference to drawings.

Figure 1:
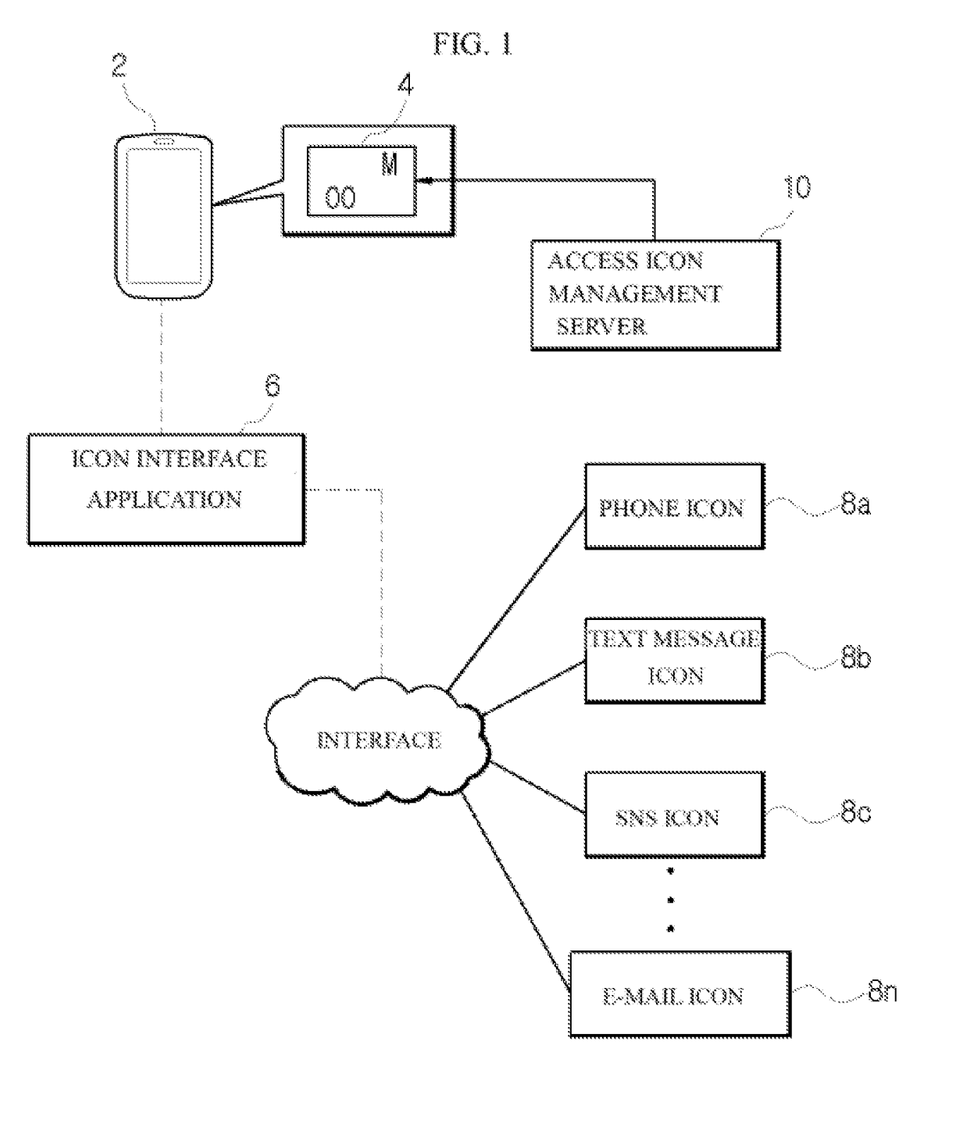
FIG. 1 is a diagram illustrating a structure of an access icon distributed through an access icon information management system according to an embodiment of the present invention.
Figure 2:
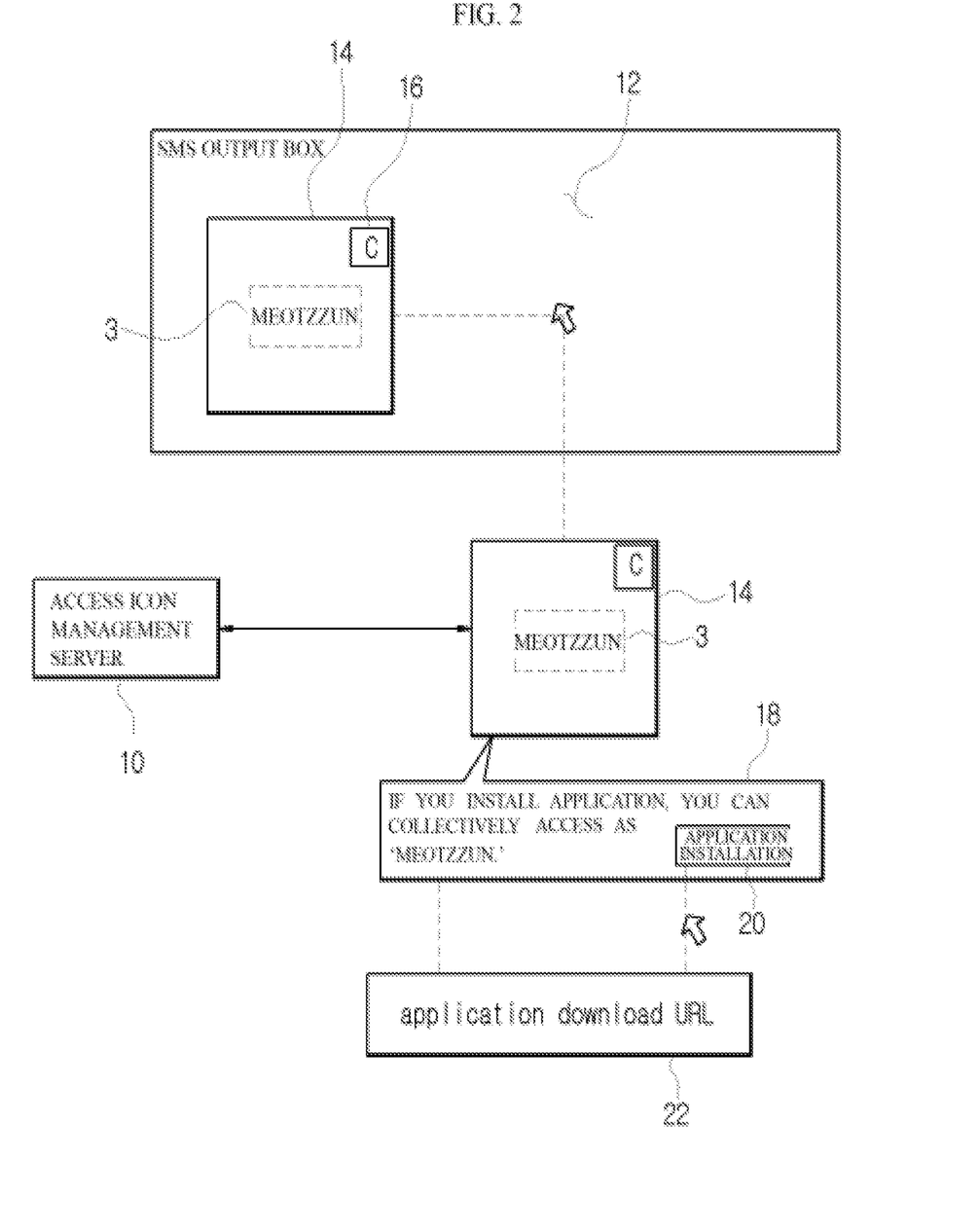
FIG. 2 is a diagram illustrating a structure of a multi-access icon distributed through the access icon information management system according to the embodiment of the present invention.
Figure 3:
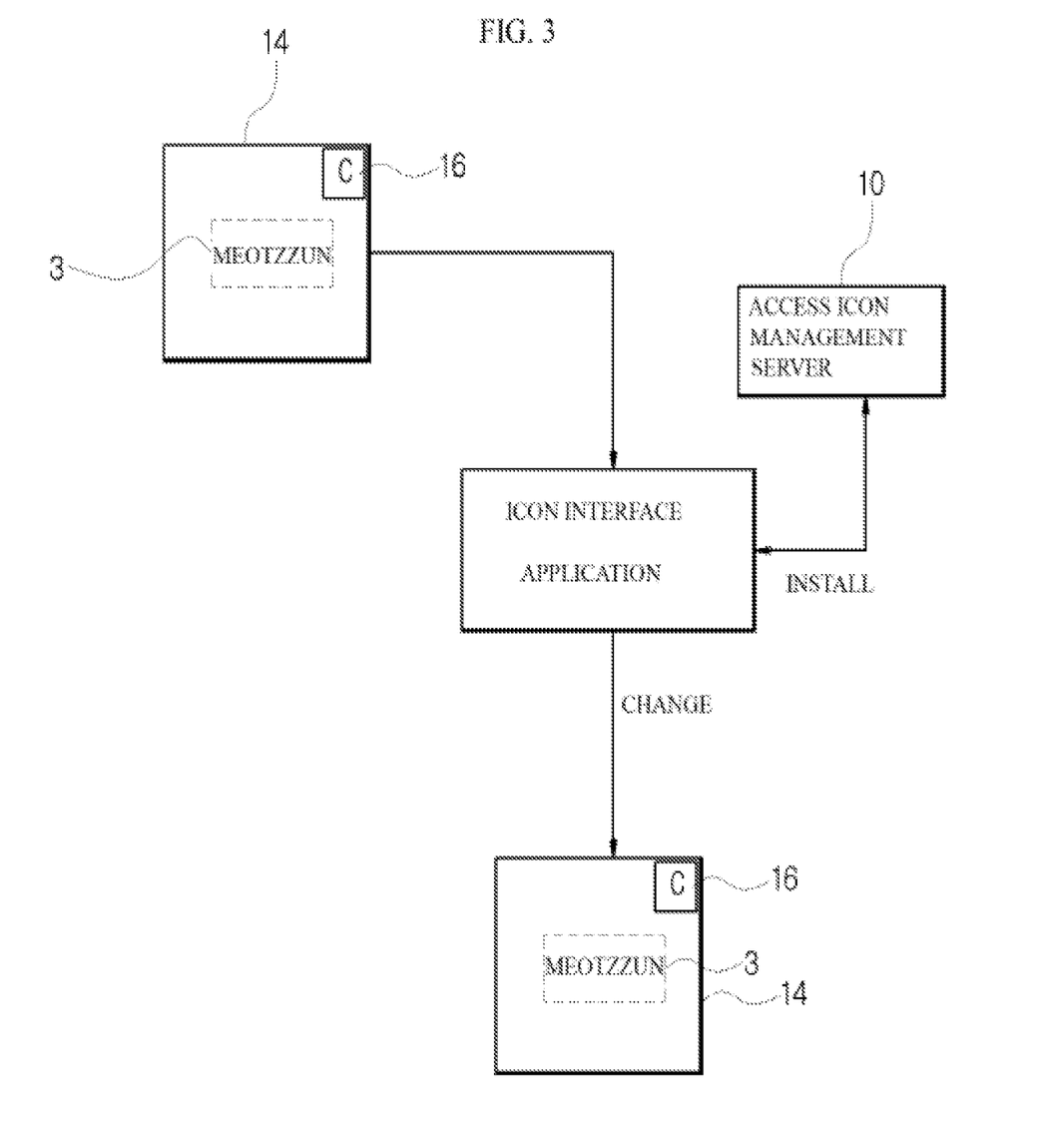
FIG. 3 is a diagram illustrating a use state of the multi-access icon distributed through the access icon information management system according to the embodiment of the present invention.
Figure 4:
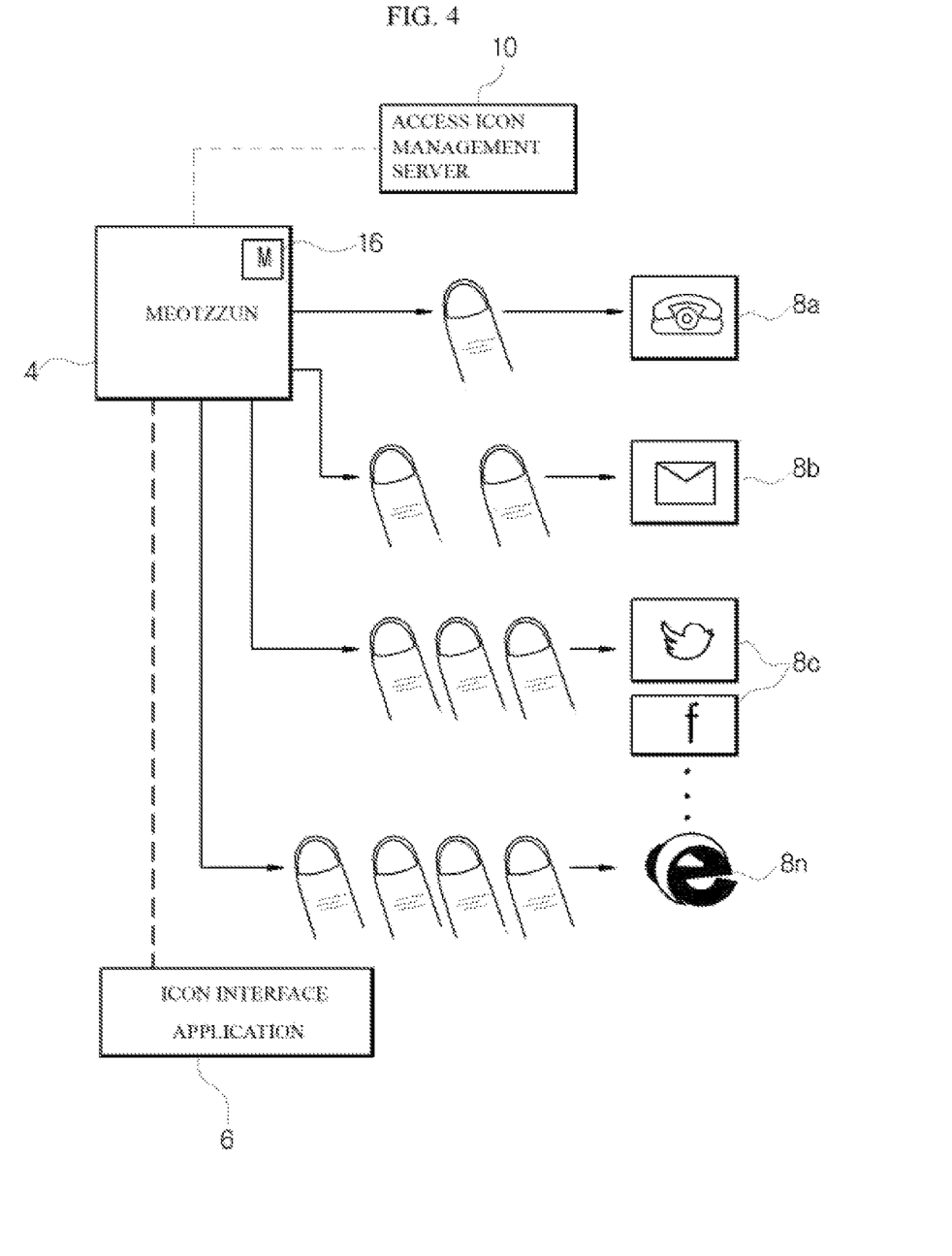
FIG. 4 is a diagram schematically illustrating a configuration of the access icon information management system according to the embodiment of the present invention.

FIG. 1 is a diagram illustrating a structure of an access icon distributed through an access icon information management system according to an embodiment of the present invention, FIG. 2 is a diagram illustrating a structure of a multi-access icon distributed through the access icon information management system according to the embodiment of the present invention, FIG. 3 is a diagram illustrating a use state of the multi-access icon distributed through the access icon information management system according to the embodiment of the present invention, and FIG. 4 is a diagram schematically illustrating a configuration of the access icon information management system according to the embodiment of the present invention.

Referring to these drawings, an access icon information management system according to an embodiment of the present invention is a system that distributes multi-access icons allowing a user to access through a simple operation in a state in which a plurality of communication means and identification information for each communication means for a counterpart are hidden as a hidden value and distributes an access icon that may be converted to a multi-access icon and simply distributed by an SMS, an e-mail, an MMS, or the like, such that there is no need to input a plurality of identification information one by one, it is possible to prevent intuitive exposure of the identification information, and communication access may be continuously made even when an actual identification information is changed.

More specifically, the access icon information management system according to the embodiment of the present invention is a system capable of allowing a user to access a plurality of heterogeneous communication means through a single unique icon, and further activating distribution of the unique icon and an application that may use the icon, thereby significantly improving convenience of the user.

The access icon information management system according to the embodiment of the present invention distributes an access icon 14 and a multi-access icon 4 connected to the access icon 14, and manages individual access icons 8a to 8n included in the access icon 14 and the multi-access icon 4, and identification information matched to the individual access icons 8a to 8n.

Herein, the access icon 14 and the multi-access icon 4 further include an ID 3 uniquely assigned for each user, and a sign character 16 for distinguishing the access icon 14 and the multi-access icon 4 from each other.

Accordingly, even when identification information matched to the individual access icons 8a to 8n of a specific individual, for example, a phone number of the specific individual is changed, the ID 3 or the multi-access icon 4 is not changed. Thus, when an acquaintance of the user already stores the ID 3 or the multi-access icon 4 in a smartphone, even if the user does not separately change the phone number one by one, the phone number may be automatically changed through communication between the application and a server.

Even when the phone number of a user is changed, the user may not inform acquaintances of the changed his or her phone number.

Particularly, in the access icon information management system according to the embodiment of the present invention, it is necessary for an application communicating with the server to be installed in a user terminal 2 in order to perform distribution and management of the multi-access icon 4. Therefore, the access icon 14, which guides installation of the application and allows the application to be simply and automatically installed, may be easily distributed through an SMS, an MMS, an e-mail, or an SNS.

More specifically, the access icon information management system according to the embodiment of the present invention includes the user terminal 2 including an icon interface application 6 installed therein to share access information by communicating with an access icon management server 10 using the multi-access icon 4 including identification information for accessing the plurality of heterogeneous communication means uniquely belong to a single user to be usable depending on the number of operations and having a unique ID 3, and perform access processing for a specific individual access icon and update processing thereof.

Further, the access icon information management system according to the embodiment of the present invention includes the access icon management server 10 configured to uniquely register the access icon 14 distributed through an SMS, an e-mail, or an MMS so as to induce installation of the icon interface application 6 for each user, and register the multi-access icon 4 matched to the access icon 14 for each user so as to distribute the multi-access icon 4 for each user by communicating with the icon interface application 6.

As described above, the access icon 14 and the multi-access icon 4 further include the sign character 16 for distinguishing the ID 3 uniquely assigned for each user, the access icon 14 and the multi-access icon 4 from each other. The ID 3 is an ID uniquely assigned for each user, and an ID such as 'Meotzzun,' 'Honggildong,' etc. that the user desires to register may be searched in the access icon management server 10 to determine whether the ID can be registered, and when it is determined that the ID can be registered, then the ID may be registered in the access icon management server 10.

The sign character 16 for distinguishing the access icon 14 and the multi-access icon 4 may be, for example, 'C' and 'M,' which are abbreviations of 'communication' and 'multi,' respectively.

Meanwhile, the access icon 14 includes a hidden text 18 indicating that when the application is installed, selective access a plurality of communication means of a specific user is possible as hidden information to be output when the access icon 14 is clicked, and the hidden text 18 is preferably a phrase inducing installation of the application, for example, 'If you install the application, you can collectively access as 'Meotzzun.'

In addition, the hidden text 18 further includes an application installation button 20, and an application download URL 22 included as hidden information for allowing the user to automatically access a storage area having an application autorun function of the access icon management server 10 when the user clicks the application installation button 20 included in the hidden text 18.

Meanwhile, as illustrated in FIG. 2, the access icon 14 may be changed to the multi-access icon 4. The access icon 14 is an icon which is automatically changed to the multi-access icon 4 of the user by communication between the icon interface application 6 and the access icon management server 10 when the icon interface application 6 is installed.

Ultimately, in the access icon information management system according to the embodiment of the present invention, the icon interface application 6 needs to be installed in the user terminal 2, and the multi-access icons 4 of acquaintances of the user that are managed by the icon interface application 6 are distributed so that the multi-access icons 4 are stored in the user terminal 2.

In this case, the multi-access icon 4 includes the unique ID 3 for each user, and may output individual access icons 8a to 8n that indicate the plurality of heterogeneous communications capable of communication access by matching with the identification information of the user on a screen of the user terminal 2 so that the user may select.

For example, the individual access icons 8a to 8n include a phone icon 8a, a text message icon 8b, an SNS access icon 8c, an e-mail icon 8n, etc. Each of the individual access icons 8a to 8n includes actual identification information, for example, a phone number, an SNS URL, an e-mail address, etc. as hidden information, but do not expose the hidden information on the screen, thus intuitive exposure of the information is prevented.

Meanwhile, the multi-access icon 4 includes a plurality of individual access icons 8a to 8n as hidden information in advance so that the individual access icons 8a to 8n are sequentially output depending on the number of operations. The icon interface application 6 processes the individual access icons 8a to 8n to be output in an order preset depending on the number of touch operations of the multi-access icon 4, and processes so as to access actual identification information matched to the respective individual access icons 8a to 8n.

That is, depending on the number of operations that the user touches the multi-access icon 4, the user may make a phone call to a counterpart having a unique ID 3, called 'Meotzzun,' transmit a text message, access a Twitter account, a Kakaotalk account or a Facebook account of the counterpart, or transmit e-mail to the counterpart.

In this case, the access icon management server 10 uniquely provides an automatic download URL of the access icons 14 for each user to the respective access icons 14 for each user.

Figure 5:
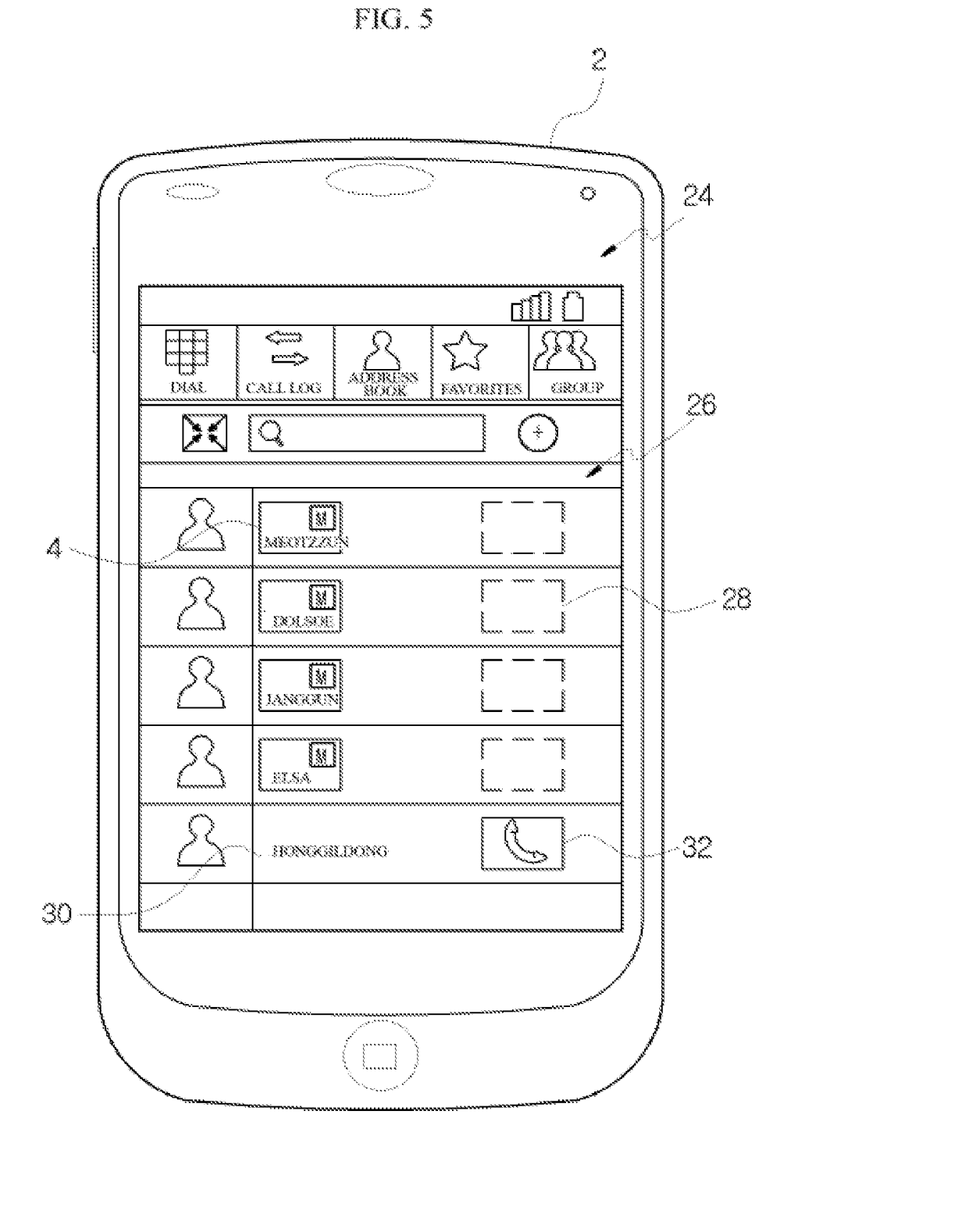
FIG. 5 is a diagram illustrating an address book output state of a smartphone by the access icon information management system according to the embodiment of the present invention.

FIG. 5 is a diagram illustrating an address book output state of a smartphone by the access icon information management system according to the embodiment of the present invention.

Referring to FIG. 5, the icon interface application 6 may output address book information 26 so that a user assigned with the multi-access icon 4 and a user not assigned with the multi-access icon 4 in the address book information 26 of the user terminal 2 may be distinguished from each other by a sign of the multi-access icon 4.

Preferably, when the icon interface application 6 is driven, separate address book information 26 is configured to be selectable on a display screen 24, and it is preferable that the address book information 26 is configured so that the user assigned with the multi-access icon 4 and the user not assigned with the multi-access icon 4 may be distinguished from each other by the sign of the multi-access icon 4.

Accordingly, the user may confirm whether any acquaintance has installed the icon interface application 6 and any acquaintance has not installed the icon interface application 6. Then, the user may transit his/her access icon 14 to the acquaintance who has not installed the icon interface application 6 to suggest the acquaintance to install the application.

In this case, when a multi-access icon 4 of any one acquaintance displayed in the address book information 26 is clicked, an access information output area 28 in which the individual access icons 8a to 8n are output may be formed in the address book information 26.

Figure 6:
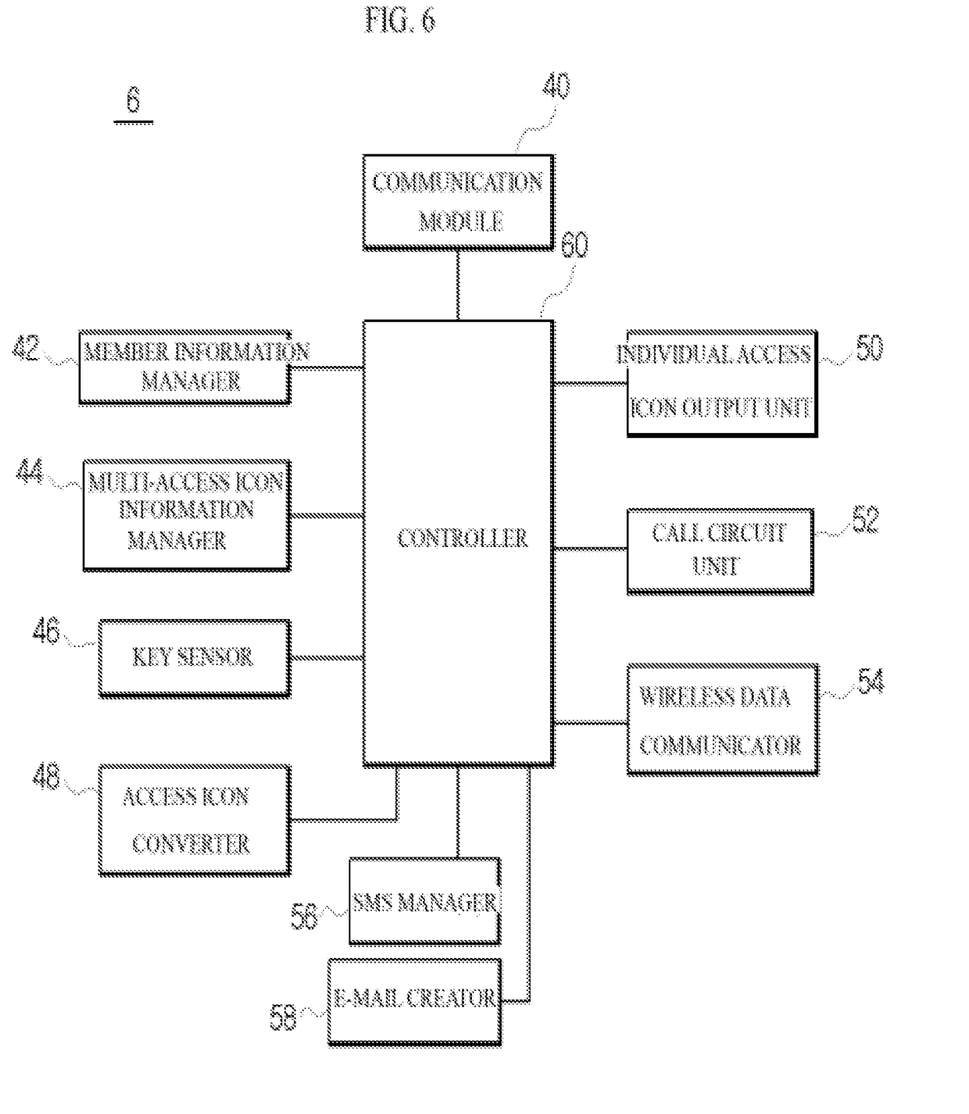
FIG. 6 is a block diagram illustrating a configuration of an icon interface application included in the access icon information management system according to the embodiment of the present invention.

FIG. 6 is a block diagram illustrating a configuration of the icon interface application included in the access icon information management system according to the embodiment of the present invention.

Referring to FIG. 6, the icon interface application 6 includes: a communication module 40 configured to perform communication with the access icon management server 10 or a user terminal 2 of a counterpart; a member information manager 42 configured to manage information for member authentication; and a multi-access icon information manager 44 configured to receive the distributed multi-access icon 4 from the access icon management server 10, and store and manage the multi-access icon 4.

Further, the icon interface application 6 includes: a key sensor 46 configured to sense the number of touch operations of the multi-access icon 4; an access icon converter 48 configured to receive the multi-access icon 4 of the specific user by communicating with the access icon management server 10 for the access icon 14 of the specific user; and an individual access icon output unit 50 configured to output the individual access icons 8a to 8n included in the multi-access icon 4 as hidden information on a screen depending on the number of touches.

Further, the icon interface application 6 includes a controller 60 configured to convert the access icon 14 to the multi-access icon 4 of the user and store and manage the multi-access icon 4 by communicating with the access icon management server 10 for the access icon 14 of the specific user, and sense the number of touches of the multi-access icon 4 to output the individual access icons 8a to 8n so as to perform access processing.

In this case, the icon interface application 6 further includes a call circuit unit 52 configured to process automatic call connection when a phone icon 8a of the individual access icons 8a to 8n of the specific user is clicked.

Meanwhile, the icon interface application 6 further includes an SMS manager 56 configured to output a text input box in which hidden phone number information included in the multi-access icon 4 is automatically input when a text message icon 8b of the individual access icons 8a to 8n of the specific user is clicked.

The icon interface application 6 further includes an e-mail creator 58 configured to output an e-mail transmission box in which e-mail address information of the user included in the multi-access icon 4 is automatically input when an e-mail icon 8n of the individual access icons 8a to 8n of the specific user is clicked.

The icon interface application 6 further includes a wireless data communicator 54 configured to output SNS information of the user included in the multi-access icon 4 to be selectable, when an SNS icon 8c of the individual access icons 8a to 8n of the specific user is clicked, and allow the user to access an URL address when specific SNS information is selected.

Functions and operation of the access icon information management system according to the embodiment of the present invention configured as described above will be described in detail with reference to the accompanying drawings.

Figure 7:
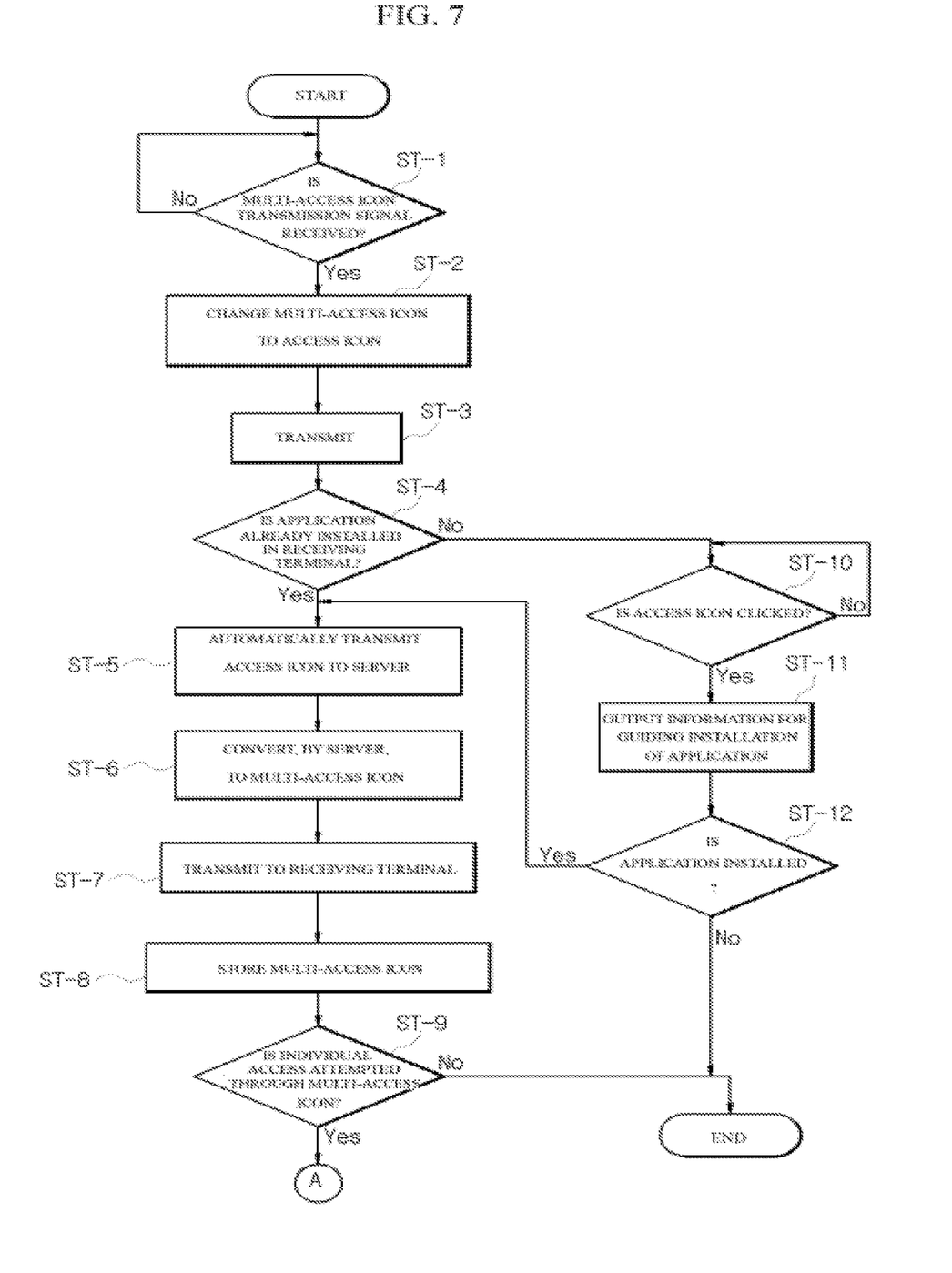
FIGS. 7 and 8 are flow charts illustrating a signal flow of the access icon information management system according to the embodiment of the present invention.
Figure 8:
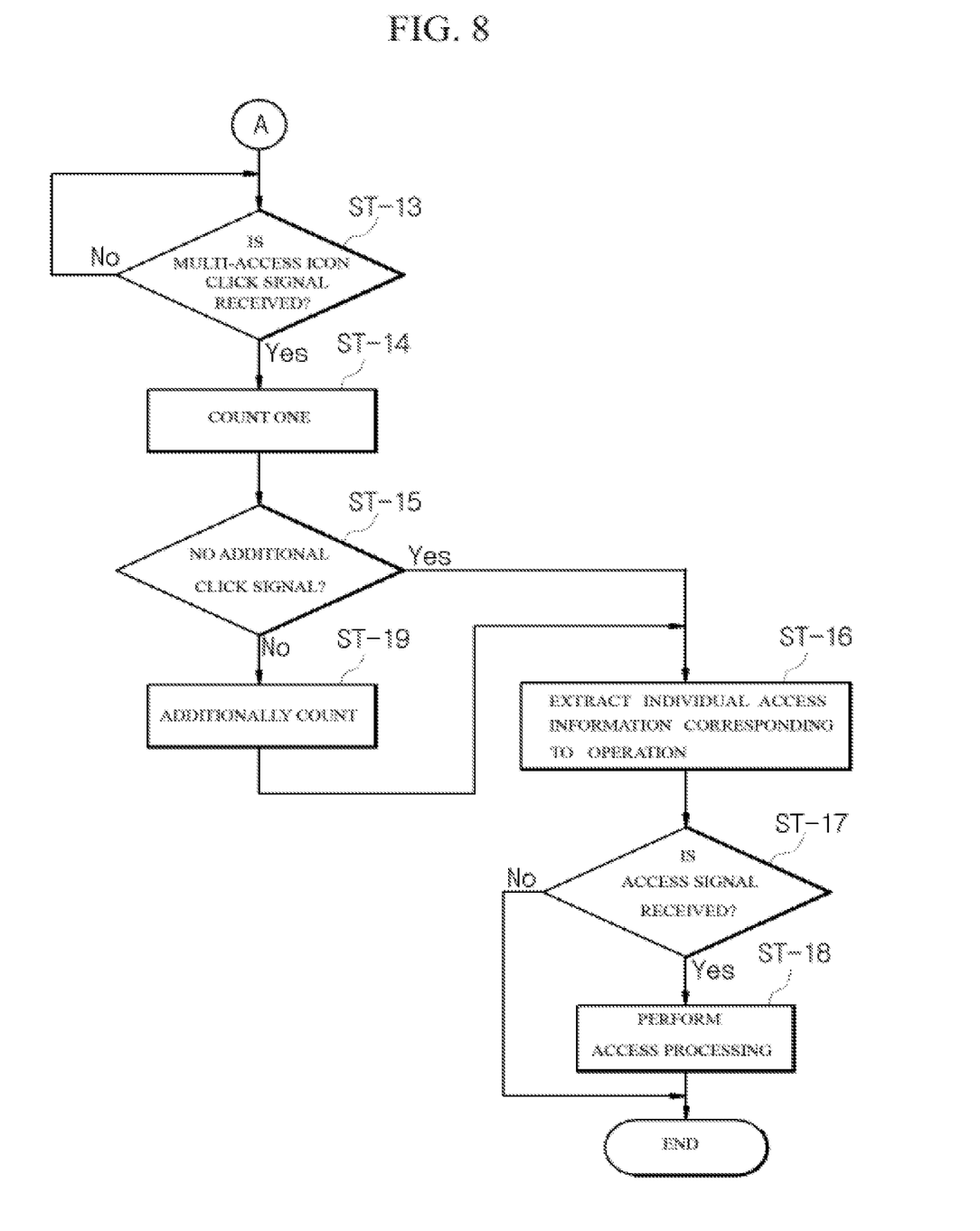

FIGS. 7 and 8 are flow charts illustrating a signal flow of the access icon information management system according to the embodiment of the present invention.

First, in the access icon information management system according to the embodiment of the present invention, the access icon management server 10 uniquely assigns and manages an ID 3 for each user.

That is, the user accesses the access icon management server 10 through the user terminal 2, inputs an ID 3, searches whether the ID 3 is registered in order to be assigned with a specific unique ID 3, thereby being assigned with the ID 3.

Next, the access icon management server 10 stores an access icon 14 and a multi-access icon 4 to be matched to the ID 3 uniquely assigned for each user, and stores and registers each identification information of individual access icons 8*a* to 8*n* included in the multi-access icon 4 of the user.

In this state, the access icon 14 and the multi-access icon 4 may be distributed, and the access icon 14 may be distributed through an SMS, an e-mail, an MMS, or various webpages even when a separate dedicated application is not installed.

Accordingly, a) when any one specific user terminal 2 receives an access icon 14 of a specific user through the SMS, the MMS, or the e-mail, in a case in which the icon interface application 6 is not installed, the following steps are performed.

That is, it is operated so as to sense whether the access icon 14 is clicked, and output the hidden text 18 explaining installation of the application included in the access icon 14.

For example, when the user clicks 14 the access icon 14, the hidden text 18 including a phrase inducing installation of the application, e.g. a phrase 'If you install the application, you can collectively access as 'Meotzzun" is output on the screen.

Further, the hidden text 18 further includes an application installation button 20, and when the user clicks the application installation button 20, an application download URL 22 having an application autorun function of the access icon management server 10 is automatically accessed to perform installation of the application.

Meanwhile, b) when the icon interface application 6 is already installed in the user terminal 2, the icon interface application 6 changes the specific access icon 14 to a specific multi-access icon 4.

That is, the icon interface application 6 automatically transmits the specific access icon 14 to the access icon management server 10.

Then, the access icon management server 10 extracts a multi-access icon 4 matched to the access icon 14 and transmits the extracted multi-access icon 4 to the user terminal 2.

In this case, the user may click the multi-access icon 4 multiple times to access various access means (e.g. the phone call, SMS, e-mail, SNS, website, etc.) of a specific counterpart having the multi-access icon 4 registered with the specific unique ID.

Accordingly, c) the icon interface application 6 receives a touch key signal for the multi-access icon 4 and counts the number of received touch key signals. Next, d) the icon interface application 6 extracts hidden individual access icons 8*a* to 8*n* matched to the sensed number of touches.

Then, the user may click a specific individual access icon 8*a* to 8*n*, and e) the icon interface application 6 receives a click signal for the specific individual access icon 8*a* to 8*n*.

Next, f) the icon interface application 6 performs communication access through actual access information matched to the specific individual access icon 8*a* to 8*n*.

That is, the multi-access icon 4 assigned for each user includes a plurality of individual access icons 8*a* to 8*n* in a hidden state, and each of the individual access icons 8*a* to 8*n* includes actual identification information (e.g. the phone number, e-mail address, website address, SNS URL, or the like) in a hidden state, thus the user terminal 2 only needs to receive the multi-access icon 4 of the user from the access icon management server 10 once at the first time.

Meanwhile, as another embodiment, the icon interface application 6 may request to and receive from the access icon management server 10 actual identification information (e.g. the phone number, e-mail address, website address, SNS URL, or the like) each time the specific individual access icon 8*a* to 8*n* is selected.

Figure 9:
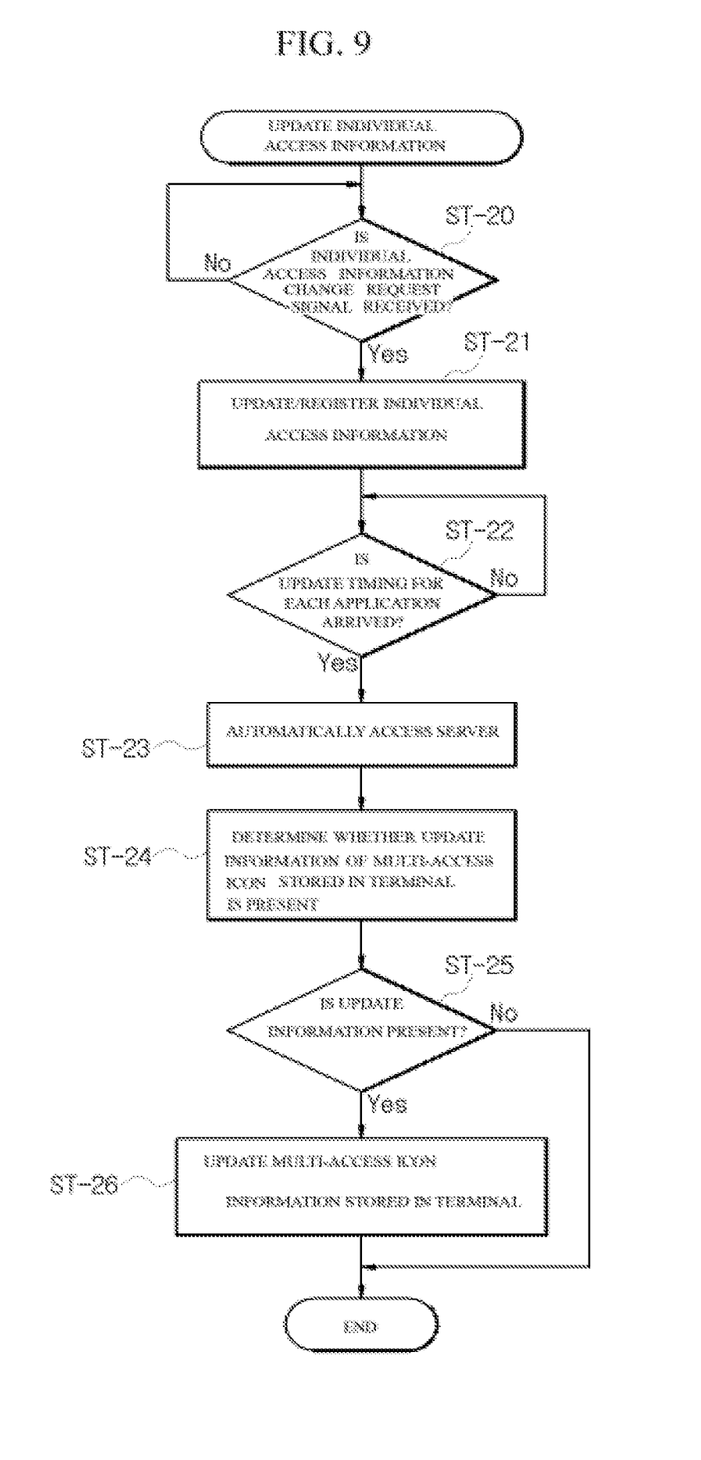
FIG. 9 is a flow chart illustrating a signal flow when individual access information is updated through the access icon information management system according to the embodiment of the present invention.

FIG. 9 is a flow chart illustrating a signal flow when individual access information is updated through the access icon information management system according to the embodiment of the present invention.

First, in steps a) to f) illustrated in FIGS. 7 and 8, when the access icon management server 10 receives an update signal of individual access information from a specific user terminal 2, information update in the access icon management server 10 is preferentially performed.

That is, the access icon management server 10 performs information update for a multi-access icon 4, and the access icon management server 10 registers update presence information of the multi-access icon 4.

Then, when the icon interface application 6 accesses the access icon management server 10 later, it is possible to automatically determine information of which multi-access icon 4 is updated.

Preferably, the update information may be checked each time the icon interface application 6 accesses the access icon management server 10, and may also be forcedly checked at a predetermined interval.

In a case in which the update information is checked at a predetermined interval, when the interval elapses, the icon interface application 6 communicates with the access icon management server 10 to determine whether update information of specific multi-access icons 4 is present.

When the update information is present, the icon interface application 6 performs update for the specific multi-access icons 4.

Preferably, the icon interface application 6 checks whether the update information is present, only for the multi-access icons 4 stored in the user terminal 2, and when the update information is present, performs update. Therefore, only dozens of seconds are required for checking and performing the update.

In the access icon information management system according to the embodiment of the present invention, the application may be easily and simply installed, and the access icon 14 including the information may be easily distributed through the e-mail, SMS, webpage, or the like. After the application is installed through the access icon 14, the access icon 14 is automatically changed to the multi-access icon 4 including various identification information for each user, thereby rapidly distributing the multi-access icon, and rapidly spreading the application for managing the access icons.

Meanwhile, the access icon information management system and the method according to the embodiment of the present invention are not limited to above described embodiment, but may be variously modified without departing from the technical gist of the present invention.

The invention claimed is:

1. An access icon information management method, comprising the steps of:
 a) receiving, by a user terminal, an access icon of a specific user through an SMS, an MMS, or an e-mail;

b) when an icon interface application is installed in the user terminal, changing, by the icon interface application, the received access icon to a specific multi-access icon;

c) counting, by the icon interface application, a number of touch operations on the specific multi-access icon;

d) extracting, by the icon interface application, one hidden individual access icon among a plurality of hidden individual access icons included in the specific multi-access icon, the extracted hidden individual access icon being matched to the number of touch operations;

e) receiving, by the icon interface application, a click signal for the extracted hidden individual access icon; and f) performing, by the icon interface application, communication access through actual access information matched to the extracted hidden individual access icon.

2. The access icon information management method of claim 1, further comprising the step of: before the step a), storing, by an access icon management server, an access icon and a multi-access icon including an ID uniquely assigned for each user, and storing and registering each identification information of a plurality of hidden individual access icons included in the multi-access icon of the user.

3. The access icon information management method of claim 1, wherein the step b) comprises the steps of:

sensing whether the received access icon is clicked, when the icon interface application is not installed;

outputting a hidden text explaining installation of the icon interface application included in the received access icon;

sensing whether an application installation button included in the hidden text is clicked; and accessing an automatic application installation URL of the received access icon.

4. The access icon information management method of claim 1, wherein the step b) further comprises the step of:

automatically transmitting, by the icon interface application, the received access icon to an access icon management server;

extracting, by the access icon management server, the specific multi-access icon matched to the received access icon; and transmitting, by the access icon management server, the extracted specific multi-access icon to the user terminal.

5. The access icon information management method of claim 1, further comprising the step of:

when an access icon management server receives a signal for updating individual access information from the user terminal, updating, by the access icon management server, information of the specific multi-access icon, registering, by the access icon management server, a presence of the updated information of the specific multi-access icon, determining, by the icon interface application, whether the updated information of the specific multi-access icon is present by communicating with the access icon management server, and performing, by the icon interface application, update for the specific multi-access icon.

6. An access icon information management system, comprising:

a user terminal including an icon interface application installed therein to share access information by communicating with an access icon management server using a multi-access icon that includes identification information for accessing a plurality of heterogeneous communication means uniquely belong to a single user to be usable depending on a number of touch operations on the multi-access icon and having a unique ID, and perform access processing for a specific individual access icon and update processing thereof; and the access icon management server configured to uniquely register the specific individual access icon distributed through an SMS, an e-mail, or an MMS so as to induce installation of the icon interface application for each user, and register the multi-access icon matched to the specific individual access icon for each user so as to distribute the multi-access icon for each user by communicating with the icon interface application, wherein the multi-access icon includes a plurality of individual access icons as hidden information in advance so that the plurality of individual access icons are sequentially output depending on the number of touch operations, and the icon interface application processes the plurality of individual access icons to be output in an order preset depending on the number of touch operations, and processes so as to access actual identification information matched to a corresponding one of the plurality of individual access icons.

7. The access icon information management system of claim 6, wherein the icon interface application includes:

a communication module configured to perform communication with the access icon management server or a user terminal of a communication counterpart;

a member information manager configured to manage information for member authentication;

a multi-access icon information manager configured to receive the multi-access icon from the access icon management server, and store and manage the multi-access icon;

a key sensor configured to sense the number of touch operations on the multi-access icon, an access icon converter configured to receive the multi-access icon of a specific user by communicating with the access icon management server for the plurality of individual access icons of the specific user;

an individual access icon output unit configured to output the plurality of individual access icons of the specific user included in the multi-access icon of the specific user as hidden information on a screen depending on the number of touch operations; and a controller configured to convert the plurality of individual access icons of the specific user to the multi-access icon of the specific user and store and manage the multi-access icon of the specific user by communicating with the access icon management server for the plurality of individual access icons of the specific user, and sense the number of touch operations to output a corresponding one of the plurality of individual access icons of the specific user so as to perform access processing.

8. The access icon information management system of claim 7, wherein the icon interface application further includes a call circuit unit configured to process an automatic call connection when a phone icon of one of the plurality of individual access icons of the specific user is clicked.

9. The access icon information management system of claim 7, wherein the icon interface application further includes an SMS manager configured to output a text input box in which hidden phone number information included in the multi-access icon of the specific user is automatically input when a text message icon of the plurality of individual access icons of the specific user is clicked.

10. The access icon information management system of claim 7, wherein the icon interface application further includes an e-mail creator configured to output an e-mail transmission box in which e-mail address information of the specific user included in the multi-access icon of the specific user is automatically input when an e-mail icon of the plurality of individual access icons of the specific user is clicked.

11. The access icon information management system of claim 7, wherein the icon interface application further includes a wireless data communicator configured to output SNS information of the specific user included in the multi-access icon of the specific user to be selectable, when an SNS icon of the plurality of individual access icons of the specific user is clicked, and allow the specific user to access an URL address when the SNS information is selected.

* * * * *